United States Patent [19]

Gregg et al.

[11] 3,748,899

[45] July 31, 1973

[54] CONDUCTIVITY AND TEMPERATURE SENSING PROBE

[75] Inventors: Michael C. Gregg, La Jolla; Charles S. Cox, Del Mar, both of Calif.

[73] Assignee: The United States of America as represented by the Secretary of the Navy, Washington, D.C.

[22] Filed: June 12, 1972

[21] Appl. No.: 261,766

[52] U.S. Cl. .............................. 73/170 A, 324/30 B
[51] Int. Cl. ............................................. G01d 1/16
[58] Field of Search .................. 73/170 A; 324/30 B

[56] References Cited
UNITED STATES PATENTS

| | | |
|---|---|---|
| 2,756,404 | 7/1956 | Anderson et al. ............. 73/170 A X |
| 3,147,431 | 9/1964 | Bennett et al. ................. 324/30 B X |

*Primary Examiner*—Jerry W. Myracle
*Attorney*—R. S. Sciascia and Paul N. Critchlow

[57] ABSTRACT

A probe-like casing is provided interiorly with a chamber having a small orifice permitting ocean water to flow into the chamber reservoir. Conductivity is sensed by separate pairs of electrodes mounted interiorly and exteriorly of the chamber. One of these pairs, the driving electrodes, apply a constant amplitude square wave electrical current across the opening while the other pair of electrodes, the sensing electrodes, measure voltage variations across the opening produced by variations in the electrical conductivity of the ocean water in the opening. Suitable means are mounted in the casing to exert a positive suction force capable of continuously drawing the ocean water at a controlled flow rate through the opening. The probe falls freely through the ocean to constantly draw in ocean water. The voltage variations sensed by the sensing electrodes are directly related to variations in the electrical resistance of the water drawn into the hole. Since variations in electrical resistance are due both to variations in temperature and electrolyte concentration, a thermistor is mounted near the orifice or opening into the chamber so as to constantly sense temperature variations present in the same volume of water that is producing the electrical resistance variations. These simultaneous measurements determine the variation in electrolyte concentration.

6 Claims, 4 Drawing Figures

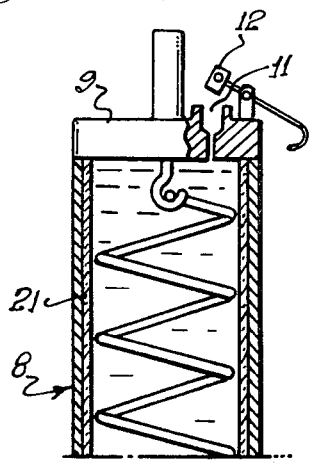
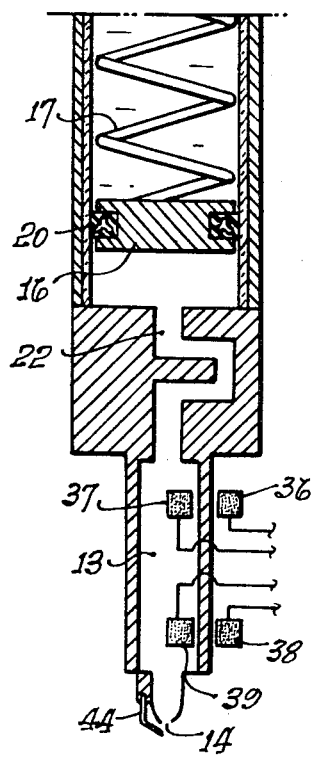
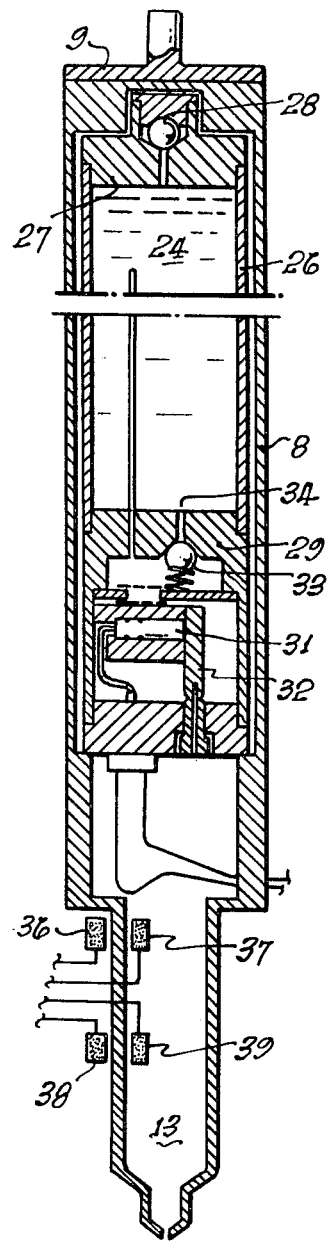

CONDUCTIVITY AND TEMPERATURE SENSING PROBE

BACKGROUND OF THE INVENTION

The present invention relates to sensor apparatus for continuously sensing variations in electrolyte concentrations and, in particular, to instruments for measuring the vertical profile of temperature and salinity in the ocean.

Temperature measurements in the vertical profile of the ocean have been made with sufficient resolution to provide interesting and valuable data on the temperature microstructure and there presently are instruments and techniques capable of providing this particular data. However, as far as is known, it has not been possible to obtain direct salinity or conductivity measurements with a comparable sensitivity. For a number of purposes, such as studies involving the density structure of the ocean or diffusion studies, it is desirable to be able to measure variations and conductivity in the order of several parts in a million. Further it is particularly desirable to provide the capability of measuring the vertical profile of both temperature and salinity simultaneously with a much greater resolution than previously has been achieved.

Apart from the field of ocean studies, a comparable sensor instrument also can be used to considerable advantage as an industrial device to continuously sense variations in electrolyte concentrations of a few parts per million. Thus, such a device can be used for sample testing or as a quality control device to signal deviations from tolerances during chemical processing.

SUMMARY OF THE INVENTION

The present apparatus includes a probe-like casing having a chamber provided with a small opening that admits fluid, such as the ocean water in which the casing may be immersed, into the chamber. In one form of the invention particularly applicable to ocean studies, the casing is provided as a free-falling body having a fixed negative buoyancy by which it gradually drops through the ocean at a controlled rate and, as will be appreciated, it is desirable to measure both salinity and temperature as the instrument is dropping. For this purpose, sensing means, such as a pair of inner and outer electrodes are employed to determine voltage variations across the small chamber opening, these variations being due to fluctuations in electrical resistance which in turn is related to the temperature and salinity of the ocean medium. To provide the voltage for this sensing means, a separate driving means, such as a pair of electrodes, are used to apply a constant amplitude electrical current across the opening, the sensing means measuring the variations in this constant amplitude. Also, since the orifice that admits fluid into the chamber casing is quite small, it is important to provide suitable means operable during the sensing operation to continuously draw the ocean medium at a controlled flow rate through the opening. In one form of the invention, temperature sensing means also are employed and these means, which may be a suitable thermistor, are mounted on the casing in close proximity to the small opening or orifice so as to assure simultaneous temperature and conductivity measurements as well as assure reliability of the data by simultaneously obtaining temperature and conductivity variations produced in the same fluid volume which is the volume of the ocean medium drawn into the casing opening.

BRIEF DESCRIPTION OF THE DRAWING

The invention is illustrated in the accompanying drawings which:

FIG. 2 is a somewhat diagrammatic sectional view of one embodiment of the conductivity probe;

FIG. 3 is a view similar to FIG. 2 showing another embodiment, and

DETAILED DESCRIPTION OF THE INVENTION

Figure 1:
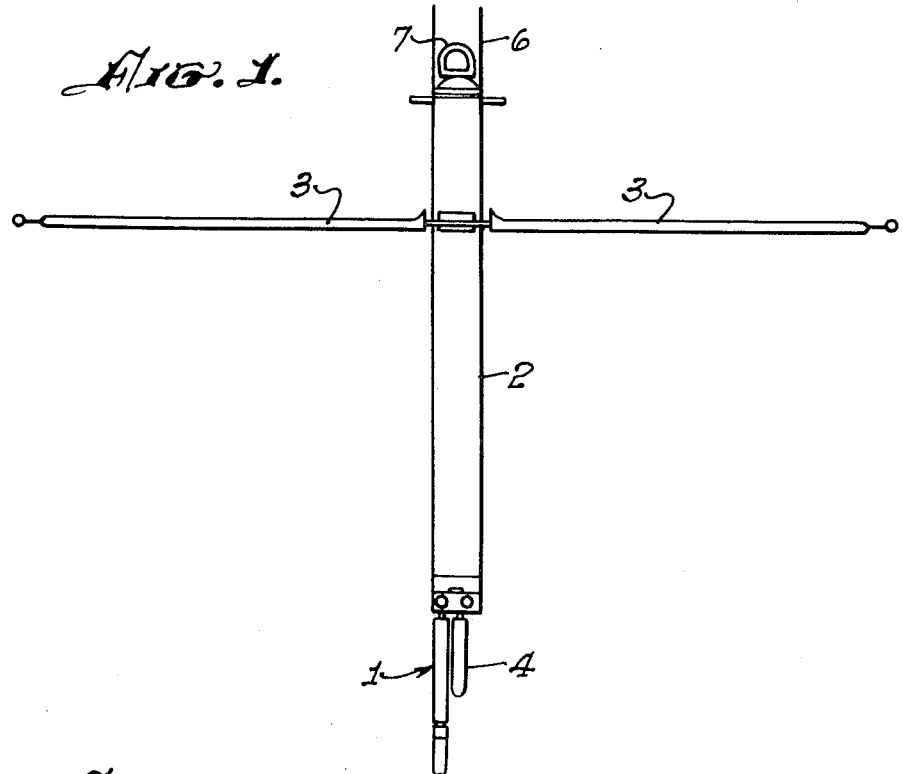
FIG. 1 is a schematic representation of a particular device known as a "Microstructure Recorder" used in ocean studies to support and control the descent of the present conductivity probe.

Referring to FIG. 1, it should be noted that the present invention relates particularly to the so-called conductivity probe which, as shown, is represented by numeral 1. The other structure shown in FIG. 1 principally provides a vehicle for deploying the conductivity probe. As shown in FIG. 1, the so-called vehicle is formed with a pressure housing 2 having four pivoted wings 3 secured to its upper part. Prior to being launched, an iron weight 4 is releasably secured to the bottom end of the pressure housing by any suitable means, such as a ball and pin release, this weight providing requisite negative buoyancy. Release of weight 4 permits the vehicle to buoyantly rise back to the surface where it signals its presence through antennaes 6. A bail 7 is secured to the top of the housing to facilitate the launching. Further, since it frequently is desirable to have the entire device sink rather rapidly to a particular depth before turning on the sensing circuits, the apparatus can include means (not shown) for holding the pivoted wings closely against the tube until this depth is reached. At this depth, a Vibrotron Pressure Sensor turns on the sensing circuits and the tape recorder contained in the housing and it also actuates a solenoid to release the wings. For example, the initial descent may be at the rate of about 1m per second and, when the wings are extended, they provide enough lift to slow the descent to 5–15cm per second. As will be appreciated, the wings may be provided with a particular pitch to produce a rotation that slows the descent to the desired rate. Sampling of the conductivity and temperature data is permitted by a magnetic tape recorder carried by the housing and usually sufficient tape can be carried for about a ½ hour operation.

Sampling of the data is concluded after a predetermined time by a pulse shutting off the tape recorder and the sensing circuits. This pulse also actuates a second release solenoid to drop the balast weight and, if all is well, the tube ascends and signals its presence. In actual practice it will be found helpful to provide a back-up for this release. A suitable pressure-actuated mechanical release pin can be incorporated for this purpose. Experience has demonstrated that such a mechanical backup has saved the day on a number of the drops which have been made.

Figure 4:
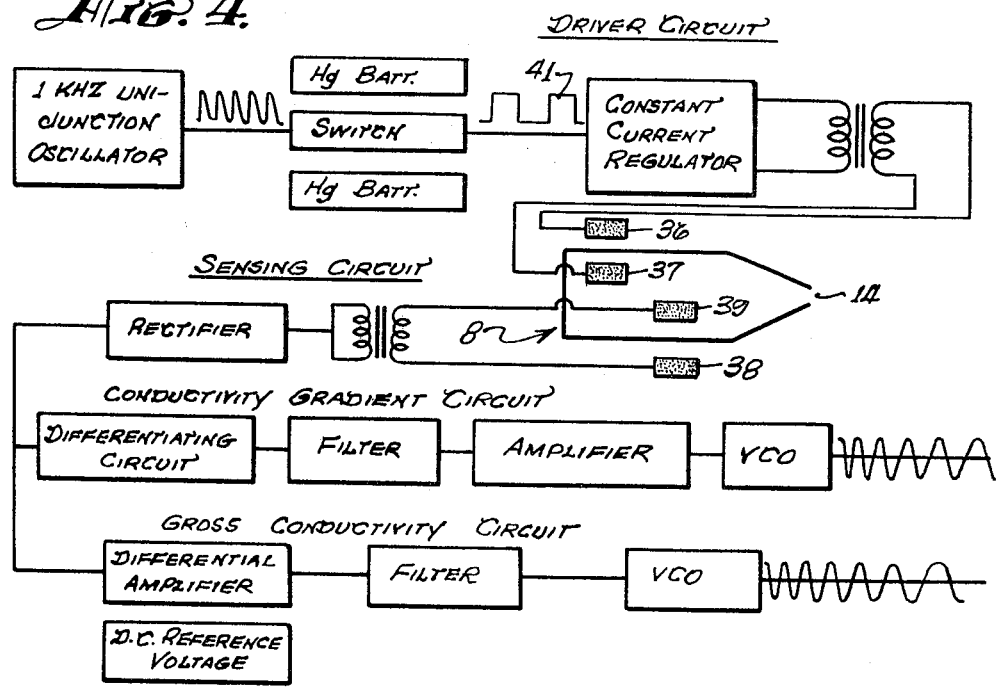
FIG. 4 is a block diagram of the conductivity probe electronics.

The conductivity probe of the present invention is illustrated in FIGS. 3, 4 and 5, FIGS. 3 and 4 showing different embodiments which, nevertheless, utilize the same basic principal of operation. As already indicated, this basic principal of operation is one of measuring the resistance of sea water while it is being sucked through a small hole in the tip of the probe.

Referring to FIG. 3 the probe is formed of a tubelike casing 8 provided at its upper end with a closure or cap 9 which mounts a flow control valve 11 having a pivotal valve-closing member 12 which can be manually tripped at the time the probe is launched. Alternatively, it can be operated from a remote position to cause the valve to open into the illustrated position. Casing 9 has a constant diameter throughout a major portion of its length with its lower end portion reduced in diameter to provide an interior chamber or reservoir as designated by numeral 13. Reservoir 13 communicates exteriorly through a small aperature or hole 14 through which sea water is sucked when the probe is operatively deployed. Opening 14, as stated, is quite small and, as presently contemplated, its size is in the order of 1 millimeter.

Since such a hole will have high hydraulic resistance, it is desirable to provide a means to positively suck the water through the hole to provide the flow needed for the present measurements. The FIG. 3 embodiment provides this sucking or drawing means by employing a special piston 16 and a spring member 17. Also, the interior of the casing above piston 16 is filled with a silicon oil which, as the piston is pulled upwardly by the spring, squirts out through the opening of valve 11. As shown, piston 16 preferably is provided with a U-packing seal 20 and reciprocation of the piston is facilitated by the use of an inner pyrex tube 21. An oil trap arrangement 22 is used to prevent oil from seeping into chamber 13 particularly when the probe is resting in a horizontal position. It is highly desirable to insure a smooth piston travel so as to produce a constant flow rate through opening 14. When the spring and piston arrangement of FIG. 2 is used, careful attention to friction is needed to assure against piston jerk which might affect the flow and consequently the resulting conductivity signal.

Another arrangement for producing the constant flow rate is illustrated in FIG. 3, this arrangement generally being one employing vacuum or suction to draw the ocean water through opening 14. Referring to FIG. 3, the upper portion of casing 8 is formed into a suction chamber 24 by employing an aluminum sleeve 26 having a top closure cap 27 which mounts a ball valve 28. The bottom of suction chamber 24 is closed by a squib housing 29 having a hollowed interior in which is mounted an explosive squib 31, a squib pin 32 and a spring-pressed, ball valve 33 normally closing a passageway 34 leading from the hollow interior into chamber 24. Squib pin 32 is firmly seated in an opening formed in the bottom wall if squib housing 29 and, of course, when the squib is energized by an appropriate electrical signal, the squib pin is unseated and the suction or reduced pressure of chamber 24 can be applied to the ocean water contained in lower chamber 13 of casing 8. Communication with chamber 24 is established by means of a capillary tube 34. Vacuum chamber 24 is evacuated prior to use using the passageway of ball valve 28 for this purpose. After the probe is launched and positioned at the depths where it is desired to take measurements, squib 31 is energized to communicate the fluid in chamber 13 with the vacuum in chamber 24. Other means for establishing the desired constant flow rate of course, are contemplated.

One of the features of the present invention is the particular manner in which the conductivity measurements are obtained. As shown in both FIGS. 2 and 3, these measurements are obtained by employing two pairs of electrodes known as driving electrodes 36, 37 and sensing electrodes 38, 39. More specifically, these pairs have inner electrodes 37 and 39 disposed within chamber 13 and outer electrodes 36 and 38 disposed exteriorly of the wall of the chamber. The pair of driving electrodes are used to pass a constant-amplitude, square-wave, electrical current through opening 14, while the pair of sensing electrodes measures the voltage across the hole, the changes in voltage being directly related to variations in the electrical resistance of the hole as water of varying conductivity is sucked into it. Since these electrodes are on opposite sides of the hole or opening, the resistance between them is concentrated where the potential lines converge in the opening. Stated in another manner, there is only one conducting path between the inner and outer electrodes and that is through opening 14. Consequently, the electrical resistance between the inner and outer electrodes is highly concentrated in the opening and becomes an accurate measure of the conductance of the fluid.

FIG. 4 provides a block diagram showing one implementation of the electronics for the driving and sensing electrodes. A constant amplitude square wave illustrated by waveform 41 is applied through a constant current regulator and a transformer to driving electrodes 36 and 37 coupled across the secondary of the transformer. Sensing electrodes 38 and 39, which sense variations in the conductivity of the fluid in hole 14, pass their signal through a transformer and a rectifier to a pair of circuits one of which is called a "Conductivity Gradient Circuit" and the other a "Gross Conductivity Circuit." Differentiating circuits are used to distinguish and separate the signal into the desired circuitry with high frequency changes in voltage being passed through a high-gain a.c. amplifier 42 and a voltage control oscillator (VCO), the resulting output being recorded on a data channel to represent a rate of change of conductivity. The signal is introduced into a dc amplifier 43 coupled to another VCO, the output being recorded as the "gross" conductivity data. As will be appreciated, the particular circuitry employed for these purposes can be varied in well-known manners. The use of the two data channels representing rate of change and gross conductivity represent a refinement which is optional. One principal concern is to assure a sufficiently dynamic range to provide the high sensitivity to rapid rates of change of the voltage. Also, special attention should be paid to the noise level as well as other problems which will be readily understood by those familiar with this art.

Another significant feature of the present invention is the fact that casing 8 mounts a temperature sensor 44 at its lower tip end and in very close proximity to opening 14. Temperature sensor 44 may be a Veco S58A20 glass probe thermistor and appropriate circuitry, of course, can be provided to couple the output of this thermistor to the recorder. As already stated, the recorder and other electronics are carried in winged housing 2 (FIG. 1). The output of thermistor 44 also can be differentiated into "gross" temperature data and "rate of change temperature data" using electronics similar to that shown in FIG. 4.

The use of a temperature sensor, thermistor 44, disposed near opening 14 is advantageous since it permits temperature measurements to be obtained on the same volume of water on which the conductivity measurements are being obtained. Since salinity studies are one of the principal objectives of the apparatus, the simultaneous measurement of both temperature and resistance of the same volume of sea water provides reliable data on which to calculate the salt concentration. In this regard, it already has been noted that temperature studies have provided data on a millimeter scale. However, the conductivity studies apparently have been unable to achieve this resolution. The present probe permits the conductivity and temperature data both to be obtained on a millimeter scale.

The operation of the conductivity and temperature probe in an ocean medium has been fully explained and should be understood. The probe permits the isolation of a small sample at a time by sucking fluid through the 1 millimeter diameter opening 14 which has a high electrical resistance permitting reliable voltage measurements which, in turn, provide the conductivity data. One particular advantage is the fact that separate sets of electrodes are used to drive the current and to sense the voltage. This arrangement permits the sensed voltage to be unaffected by changes in the polarization resistance at the driving electrodes and thus permits a sensing of the voltage with a very low noise level. Because of the smallness of opening 14, it is desirable to suck fluid through the orifice to provide a smooth and uniform flow which, in turn, reduces noise. A jerky flow obviously would result in spurious conductivity signals which are undesirable. In addition to the use of the present conductivity probe as a free-falling body in the ocean, it also is contemplated that the device can be used as a sensor for various industrial purposes and, in these industrial uses, the probe can be used with a pump that sucks fluid through the opening. Some of the industrial practices that might benefit by the use of such a device are sample testing or quality control for signaling deviations from tolerance and chemical processing.

Obviously many modifications and variations of the present invention are possible in the light of the above teachings. It is therefore to be understood that within the scope of the appended claims the invention may be practiced otherwise than as specifically described.

We claim:
1. Apparatus for continuously sensing minute variations in the electrical conductivity of an electrolytic fluid in which it is immersed, comprising:
   a probe-like casing formed with a chamber and having its tip end provided with a small opening for admitting said fluid into the chamber when said tip end is operatively immersed in the fluid,
   means operable during the sensing for continuously drawing said fluid at a controlled flow rate through said opening,
   driving means for applying a constant amplitude electrical current across said opening, and
   sensing means for determining voltage variations across the opening produced by variations in the electrical conductivity of the electrolytic fluid being drawn through the opening.
2. The apparatus of claim 1 wherein said driving and said sensing means each includes a separate pair of inner and outer electrodes mounted respectively inside and outside of the chamber,
   said driving means further including means for applying a constant amplitude current across its pair of inner and outer electrodes whereby electrical resistance to said current flow is concentrated in said opening.
3. The apparatus of claim 2 wherein said apparatus further includes means enabling said casing to descend at a slow uniform rate through an ocean environment for determining the conductivity gradients in the ocean profile.
4. The apparatus of claim 1 further including:
   temperature sensing means carried by said casing for sensing temperature variations in the volume of fluid in said opening whereby said temperature and conductivity variations are produced by the same fluid volume.
5. The apparatus of claim 4 wherein said apparatus further includes means enabling said casing to descend at a slow uniform rate through an ocean environment for determining the temperature and conductivity gradients in the ocean profile.
6. The apparatus of claim 5 wherein said means for continuously drawing the ocean fluid through said opening are mounted in the casing.

* * * * *